(12) United States Patent
Kardolus et al.

(10) Patent No.: US 10,454,377 B2
(45) Date of Patent: Oct. 22, 2019

(54) RESONANT POWER CONVERTER (71) Applicant: ABB B.V., Rotterdam (NL)

(72) Inventors: Menno Kardolus, Duivendrecht (NL); Jos Schijffelen, Breda (NL); Mark Gröninger, Venlo (NL); Dolf Van Casteren, Eindhoven (NL)

(73) Assignee: ABB B.V., Rotterdam (NL)

( * ) Notice: Subject to any disclaimer, the term of this patent is extended or adjusted under 35 U.S.C. 154(b) by 0 days.

(21) Appl. No.: 13/945,465

(22) Filed: Jul. 18, 2013

(65) Prior Publication Data
US 2013/0301307 A1 Nov. 14, 2013

Related U.S. Application Data (63) Continuation of application No. PCT/EP2012/050811, filed on Jan. 19, 2012.

(30) Foreign Application Priority Data

Jan. 19, 2011 (EP) .................................... 11151382

(51) Int. Cl.
H02M 3/335 (2006.01)
H02M 3/337 (2006.01)
(Continued)

(52) U.S. Cl.
CPC ..... *H02M 3/33507* (2013.01); *H02M 3/3376* (2013.01); *H02M 3/33569* (2013.01);
(Continued)

(58) Field of Classification Search
CPC ............. H02M 3/335; H02M 3/33507; H02M 3/33515; H02M 3/33523; H02M 3/3353;
(Continued)

(56) References Cited

U.S. PATENT DOCUMENTS 4,876,635 A * 10/1989 Park ...................... H02M 3/337
363/132
5,200,887 A 4/1993 Loroi et al.
(Continued)

FOREIGN PATENT DOCUMENTS

CN 101820222 A * 9/2010 .......... H02M 3/3376
EP 0 595 091 A2 5/1994
(Continued)

OTHER PUBLICATIONS

Notification Concerning Transmittal of International Preliminary Report on Patentability (Chapter 1 of the Patent Cooperation Treaty) (Form PCT/IB/326 and PCT/IB/373) and the Written Opinion of the International Searching Authority (Form PCT/ISA 237) dated Aug. 1, 2013, issued in corresponding International Application No. PCT/EP2012/050811. (7 PGS).

(Continued)

*Primary Examiner* — Gary L Laxton
*Assistant Examiner* — Carlos O Rivera-Perez
(74) *Attorney, Agent, or Firm* — Taft Stettinius & Hollister LLP; J. Bruce Schelkopf (57) ABSTRACT A resonant power converter includes a resonance tank formed by a capacitance component and an inductance component, at least two switches connected to the resonance tank and a voltages source in a bridge configuration, a number of snubber capacitors connected in parallel to each of the switches, a controller configured to control ON and OFF timings of the at least two switches so as to excite the resonance tank, and a voltage sensor configured to sense a voltage drop across at least one of the switches. The controller is configured to switch the at least one of the switches to the ON state when the absolute value of the sensed voltage drop reaches a minimum.

13 Claims, 6 Drawing Sheets (51) Int. Cl.
*H02M 7/48* (2007.01)
*H02M 1/00* (2006.01)

(52) U.S. Cl.
CPC .............. *H02M 2001/0058* (2013.01); *H02M 2007/4815* (2013.01); *Y02B 70/1433* (2013.01); *Y02B 70/1491* (2013.01)

(58) Field of Classification Search
CPC ......... H02M 3/33569; H02M 3/33538; H02M 3/33546; H02M 3/33553; H02M 3/3376; H02M 3/337; H02M 2001/0054; H02M 2001/0058; H02M 2007/4815; H02M 2007/4818; H02M 7/217; H02M 7/219; H02M 7/4826; H02M 7/523; H02M 7/5233; H02M 2001/0032; H02M 2001/0035; H02M 2001/0067; H02M 2001/007; H02M 2001/0041; H02M 2001/0048; H02M 2001/0009; H02M 2001/0025; H02M 2007/4826; H02M 1/42; H02M 1/4208; H02M 1/4216; H02M 1/4233; H02M 1/4241; H02M 1/425; H02M 1/4258; H02M 1/44; H02M 1/08; H02M 1/083; H02M 2007/2195; H02M 2007/4811; Y02B 70/12; Y02B 70/123; Y02B 70/126; Y02B 70/1416; Y02B 70/1425; Y02B 70/1433; Y02B 70/1441; Y02B 70/1491; Y02B 70/10; Y02B 70/14; Y02B 70/1457; Y02B 70/1458
USPC ...... 363/15–21.18, 40–48, 56.12, 89, 95–99, 363/131–134; 323/205–211, 222–226, 323/235, 236, 271–275, 282–287, 299, 323/351, 319; 307/31–35
See application file for complete search history.

(56) References Cited

U.S. PATENT DOCUMENTS

| | | | |
|---|---|---|---|
| 5,321,600 A | 6/1994 | Fierheller | |
| 5,341,083 A | 8/1994 | Klontz et al. | |
| 5,644,214 A * | 7/1997 | Lee | H02M 1/4225 323/211 |
| 7,313,004 B1 * | 12/2007 | Yang et al. | 363/21.02 |
| 8,184,456 B1 * | 5/2012 | Jain et al. | 363/21.02 |
| 8,681,520 B2 * | 3/2014 | Tao | H02M 3/3376 363/21.02 |
| 9,312,758 B2 * | 4/2016 | Tyrrell | H02M 3/156 |
| 2006/0291117 A1 * | 12/2006 | Kyono | H02M 3/337 361/90 |
| 2008/0130324 A1 | 6/2008 | Choi et al. | |
| 2008/0224681 A1 * | 9/2008 | Padure | H02M 3/1588 323/288 |
| 2008/0310194 A1 * | 12/2008 | Huang et al. | 363/21.18 |
| 2009/0091955 A1 | 4/2009 | Choi et al. | |
| 2009/0310387 A1 * | 12/2009 | Lu | H02M 3/3376 363/21.03 |
| 2010/0001581 A1 | 1/2010 | Broesse et al. | |
| 2010/0020569 A1 * | 1/2010 | Melanson et al. | 363/21.03 |
| 2010/0079085 A1 * | 4/2010 | Wendt | H05B 33/0815 315/294 |
| 2010/0220501 A1 | 9/2010 | Krause | |
| 2010/0225274 A1 | 9/2010 | Fujitake | |
| 2011/0085354 A1 * | 4/2011 | Wang | H02M 1/4225 363/21.02 |
| 2011/0261591 A1 | 10/2011 | Krause | |

FOREIGN PATENT DOCUMENTS

| | | |
|---|---|---|
| EP | 2 218 607 A1 | 8/2010 |
| WO | WO 2010/086788 A2 | 8/2010 |

OTHER PUBLICATIONS

International Search Report (PCT/ISA/210) dated Jun. 8, 2012, by the European Patent Office as the International Searching Authority for International Application No. PCT/EP2012/050811.
Written Opinion (PCT/ISA/237) dated Jun. 8, 2012, by the European Patent Office as the International Searching Authority for International Application No. PCT/EP2012/050811.
Search Report dated Jun. 14, 2011, by the European Patent Office for Application No. 11151382.6.
Kim et al., "A New Zero Voltage Switching High Frequency Dc-to-dc Converter", Dept. of Electrical Engineering, Korea Advanced Institute of Science and Technology (KAIST), Aug. 1991, pp. 217-221.
Sumiyoshi et al., "High-Frequency Transformer Isolated Soft-Switching DC-DC Converter for Fuel Cell Cogeneration System", Power Electronics and Motion Control Conference, IEEE, Aug. 2006, pp. 746-748.
Huber et al., "Effect of Valley Switching and Switching-Frequency Limitation on Line-Current Distortions of DCM/CCM Boundary Boost PFC Converters", IEEE Transactions on Power Electronics, Feb. 2009, pp. 339-347, vol. 24, No. 2.
Ridley et al., "Design and control of a full-wave, quasi-resonant flyback converter", Virginia Power Electronics Center, Virginia Polytechnic Institute and State University, Feb. 1988, pp. 41-49.
International Search Report (PCT/ISA/210) dated Mar. 4, 2013, by the European Patent Office as the International Searching Authority for International Application No. PCT/EP2012/050813.
Written Opinion (PCT/ISA/237) dated Mar. 4, 2013, by the European Patent Office as the International Searching Authority for International Application No. PCT/EP2012/050813.
Search Report dated Jul. 28, 2011, by the European Patent Office for Application No. 11151395.8.
Colak et al., "High current, low voltage modular power converter for lead acid battery charging", Sustainable Energy Technologies, IEEE, Nov. 2008, pp. 1042-1046.
Pothana et al., "Parallel Operation of Power Factor Corrected AC-DC Converter Modules With Two Power Stages", Power Electronics and Drive Systems, Nov. 2007, pp. 953-960.
Egan et al., "Corrected Single-Stage Inductive Charger for Electric Vehicle Batteries", Industrial Electronics, IEEE Transaction, Apr. 2007, pp. 1217-1226, vol. 54, No. 2.
Notification Concerning Transmittal of International Preliminary Report on Patentability (Forms PCT/IB/326 and PCT/IB/373) and the Written Opinion of the International Searching Authority ( Form PCT/ISA 237) dated Aug. 1, 2013, issued in corresponding International Application No. PCT/EP2012/050813. (9 pgs.).

* cited by examiner

RESONANT POWER CONVERTER

RELATED APPLICATIONS

This application claims priority as a continuation application under 35 U.S.C. § 120 to PCT/EP2012/050811, which was filed as an International Application on Jan. 19, 2012 designating the U.S., and which claims priority to European Application 11151382.6 filed in Europe on Jan. 19, 2011. The entire contents of these applications are hereby incorporated by reference in their entireties.

FIELD

The present disclosure relates to a resonant power converter. More particularly, the present disclosure relates to a resonant converter that operates with low switching losses under varying operating conditions.

BACKGROUND INFORMATION

Power converters are used to transfer electrical energy from one circuit to another. For example, energy is transformed from the power grid to a load while converting voltage and current characteristics. Switching power converters are increasingly used to replace linear regulators and transformers because they offer high efficiency, small size and reduced weight.

A resonant converter of the type indicated above has been described by A. Sokolow "100-kW DC-DC Converter Employs Resonant-Filter", published on the Internet site Power Electronics in December 2010. Such converters are particularly attractive for high power applications, i.e., for a power in the order of magnitude of 10-100 kW.

Known resonant converters may be operated at a fixed source voltage and under stable load conditions, so that it is possible to configure the converter such that a Zero Voltage Switching mode of operation (ZVS) is reached or at least approximated. This means that each switch should be switched to the ON state at a timing when the voltage drop across this switch crosses zero or at least reaches a minimum (valley switching), so that switching losses are reduced to minimum.

SUMMARY

An exemplary embodiment of the present disclosure provides a resonant power converter which includes a resonance tank formed by a capacitance component and an inductance component, and at least two switches connected to the resonance tank and a voltage source in a bridge configuration. In addition, the exemplary resonant power converter includes a plurality of snubber capacitors connected in parallel to each of the switches, and a controller configured to control ON and OFF timings of the at least two switches so as to excite the resonance tank. The exemplary resonant power converter also includes a voltage sensor configured to sense a voltage drop across at least one of the switches. The controller is configured to switch the at least one of the switches to the ON state when the absolute value of the sensed voltage drop reaches a minimum.

BRIEF DESCRIPTION OF THE DRAWINGS

Embodiments of the disclosure will now be described in conjunction with the drawings, wherein:

FIGS. 2(A)-(D) show waveforms for explaining the function of the power converter shown in FIG. 1;

FIGS. 3(A)-(C) show waveforms illustrating a mode of operation with reduced output current;

DETAILED DESCRIPTION

Exemplary embodiments of the present disclosure provide a resonant converter that operates with low switching losses under varying operating conditions.

An exemplary embodiment of the present disclosure provides a resonant power converter which includes a resonance tank formed by a capacitance component and an inductance component, and at least two switches connected to the resonance tank and a voltage source in a bridge configuration. In addition, the resonant power converter includes a plurality of snubber capacitors connected in parallel to each of the switches, and a controller configured to control ON and OFF timings of the at least two switches so as to excite the resonance tank. The exemplary resonant power converter also includes a voltage sensor for sensing a voltage drop across at least one of the switches. The controller is configured to switch the at least one of the switches to the ON state when the absolute value of the sensed voltage drop reaches a minimum.

Thus, when changes in the source voltage or changes of the load conditions cause a shift of the timings at which zero voltage switching or valley switching is to be effected, the converter according to the disclosure will automatically adapt to the changed conditions.

More specific optional features of the present disclosure are described in with reference to the exemplary embodiments in more detail below. These features permit among others an efficient power conversion over a wide range of power and output current, an active power factor correction and a reduction of EMI.

In accordance with an exemplary embodiment, output current control is achieved by varying the switching frequency of the switches. For example, the switching frequency is slightly above the resonance frequency of the resonant tank when the converter operates at full power. When the switching frequency is increased further, the converted power and the output current will drop.

When the power demand decreases further, a continued increase of the switching frequency might result in increased switching losses and, correspondingly, a reduced efficiency of the converter. In these cases, it is possible to further reduce the output current by skipping some of the ON periods of the switches while keeping the resonance tank in resonance, or by operating the switches in a burst mode, where the periodic pattern of ON and OFF periods of the switches is chopped into a sequence of bursts interrupted by phases in which all switches are OFF.

In addition to controlling the output current, it is also possible to control the input current, and by employing nested feedback loops, it is also possible to control both the output current and the input current. Control of the input current allows for maintaining an approximately sinusoidal input current curve to thereby effect a power factor correction.

Figure 1:
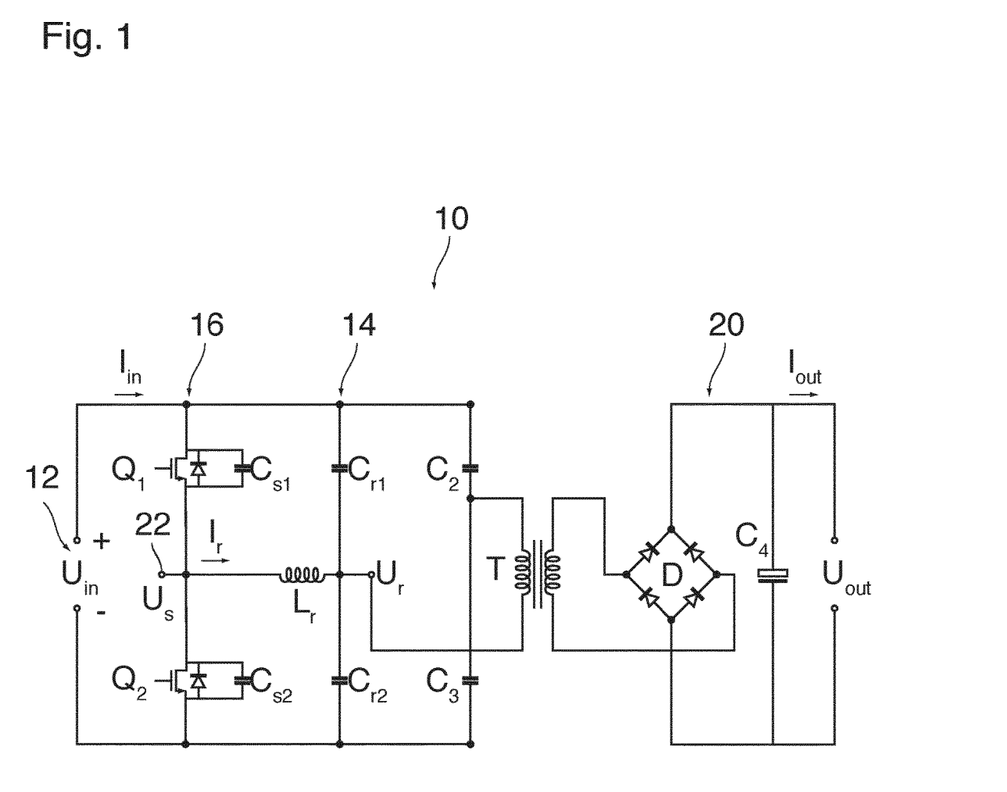
FIG. 1 is a circuit diagram of a power converter according to an exemplary embodiment of the present disclosure.

As is shown in FIG. 1, a resonant converter 10 is configured to convert an input voltage $U_{in}$ into an output voltage $U_{out}$. The input voltage $U_{in}$ is a DC voltage or a pulsating DC voltage supplied by a voltage source 12.

A resonant tank 14 is formed by an inductor $L_r$ and two capacitor sets, one capacitor set being a parallel circuit of capacitors $C_{r1}$ and $C_{r2}$, and the other set being a parallel circuit of capacitors C2 and C3 (LCC topology with parallel load). The resonant tank 14 is connected to the voltage source 12 via a half bridge 16 formed by switches $Q_1$ and $Q_2$. The switches $Q_1$ and $Q_2$ are electronic switches, for example, IGBTs. The gates of these switches are connected to an electronic controller 18 (see FIG. 4) that will be described later. A snubber capacitor $C_{s1}$, $C_{s2}$ is connected in parallel to each of the switches $Q_1$ and $Q_2$.

The switches are alternatingly opened and closed at a switching frequency in the order of magnitude from 25 kHz to 50 kHz so as to cause the resonance tank 14, which may have a resonance frequency of 25 kHz, for example, to oscillate. The capacitance components of the resonance tank 14 are formed by the capacitors $C_{r1}$ and $C_{r2}$ which are arranged symmetrically with respect to the inductor $L_r$, just as the switches $Q_1$ and $Q_2$. The capacitor $C_{r1}$ is connected between the plus pole of the voltage source 12 and the inductor $L_r$, and the capacitor $C_{r2}$ is connected between the inductor $L_r$ and the minus pole of the voltage source.

The two capacitors $C_2$ and $C_3$ with equal capacity are connected in series between the plus and minus poles of the voltage source 12, in parallel with the resonance tank 14. When the resonance tank oscillates, a voltage $U_r$ at the point connecting the inductor $L_r$ to the capacitors $C_2$ and $C_3$ will oscillate around a center voltage that is defined by the mid-point between the capacitors $C_2$ and $C_3$. This voltage $U_r$ drives the primary side of a transformer T whose secondary side is connected to a rectifier 20 formed by a diode full bridge D and capacitor $C_4$. The voltage drop across the capacitor $C_4$ forms the output voltage $U_{out}$. When a load is connected, a discharge circuit for the capacitor $C_4$ is closed, and an output current $I_{out}$ may flow in this discharge circuit.

When the switch $Q_1$ is ON while the switch $Q_2$ is OFF, an input current $I_{in}$ will flow through the switch $Q_1$ and the inductor $L_r$ to charge the capacitor $C_{r2}$. As long as the voltage drop across the inductor $L_r$ is positive ($U_{in} > U_r$), a current $I_r$ in the resonance tank 14 will increase, and the capacitor $C_{r1}$ will be discharged. When capacitor $C_{r1}$ has been discharged completely, the inductor $L_r$ will cause the current $I_r$ to continue, so that capacitor $C_{r2}$ will be charged further and capacitor $C_{r1}$ will be charged with opposite polarity. The voltage drop across inductor $L_r$ becomes negative and the current $I_r$ decreases. Eventually, the current $I_r$ will change sign. Then, the switch $Q_1$ is switched OFF and switch $Q_2$ is switched ON, so that the capacitors $C_{r1}$ and $C_{r2}$ will be discharged via the inductor $L_r$ and the switch $Q_2$. The current will increase until the capacitor $C_{r2}$ is discharged, and the current will gradually drop to zero while the voltage $U_r$ becomes negative relative to the minus pole of the voltage source 12. Then, the switch $Q_2$ will be switched off and switch $Q_1$ will be switched ON again, so that another cycle may start. In this way, a primary current in the transformer T is kept oscillating, and when the switching frequency of the switches $Q_1$ and $Q_2$ is close to the resonance frequency of the resonance tank 14, a maximum of power will be transferred.

In order to prevent the voltage source 12 from being short-circuited via the switches $Q_1$ and $Q_2$, the ON periods of these switches are to be separated by a certain minimum dead time. During these dead times, currents that would otherwise flow through the switches will be diverted into the snubber capacitors $C_{s1}$, $C_{s2}$ and, to a smaller part, into the device capacitances of the IGBTs.

Figure 2:
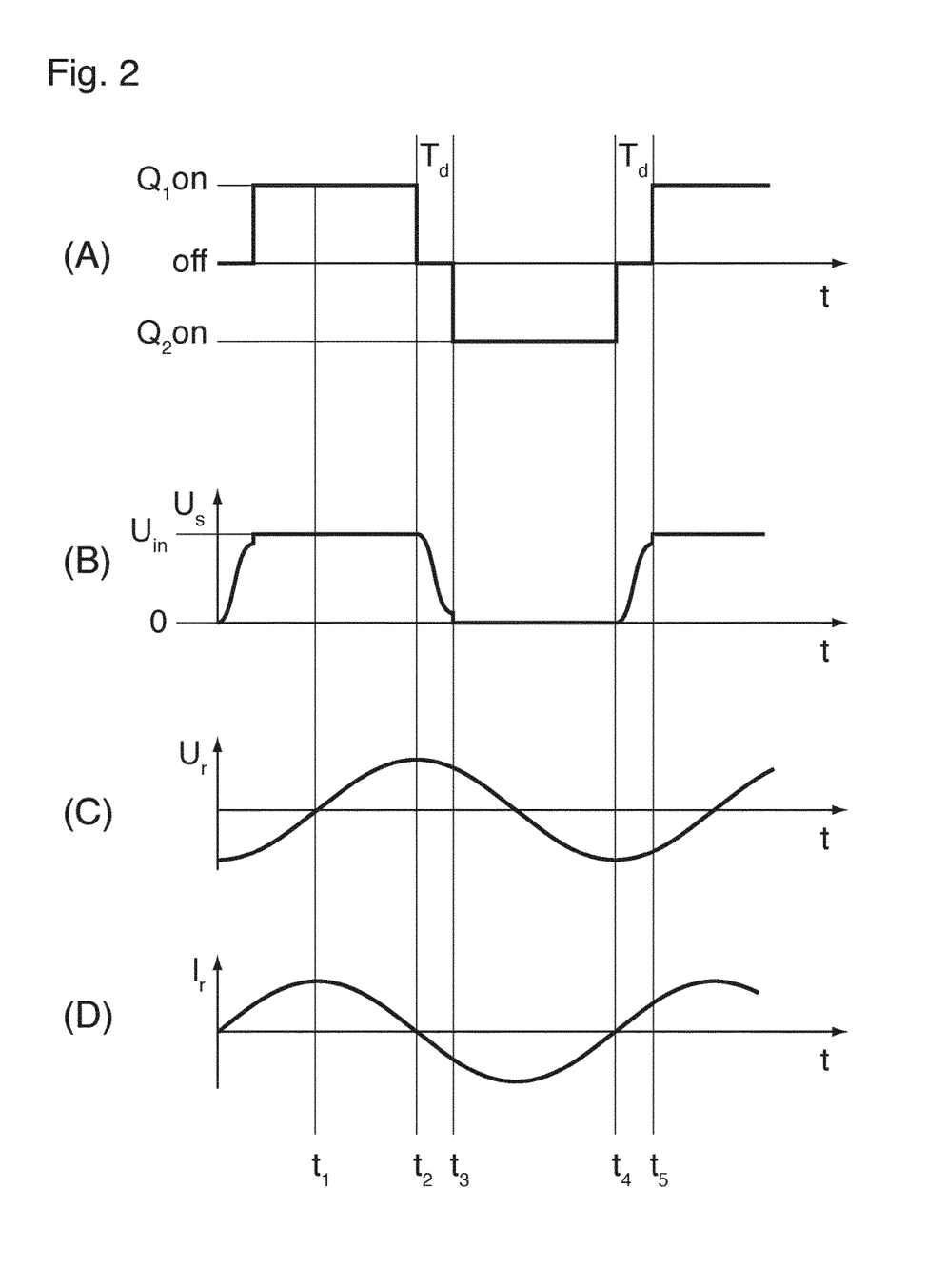

FIG. 2(A) illustrates the sequence of ON and OFF periods of the switches $Q_1$ and $Q_2$. In this example, the ON periods are separated by dead times $T_d$ which, for reasons that will become clear below, are larger than the minimum dead time mentioned above.

FIG. 2(B) illustrates a waveform of a voltage $U_s$ that is sensed by a voltage sensor 22 (FIG. 1) at the junction point between the two switches $Q_1$ and $Q_2$. Thus, the voltage $U_s$ corresponds to the voltage drop across the switch $Q_2$ whereas $U_{in} - U_s$ represents the voltage drop across the switch $Q_1$. As a consequence of the symmetry of the circuit shown in FIG. 1, the waveform of the voltage $U_s$ shown in FIG. 2(B) is point-symmetric.

FIG. 2(C) shows the voltage $U_r$ of the resonance tank. In resonance, this voltage is delayed by 90° relative to the voltage $U_s$.

FIG. 2(D) shows the current $I_r$ in the resonance tank. This current is 90° ahead of the voltage $U_r$ and is thus at least approximately in phase with the (non-sinusoidal) waveform of the voltage $U_s$.

At the time $t_1$ in FIGS. 2(A)-(D), the switch $Q_1$ is ON, while the switch $Q_2$ is OFF. The current $I_r$ is supplied by the closed switch $Q_1$, and the voltage $U_r$ increases. At the time $t_2$, the voltage $U_r$ has reached its maximum and, accordingly, the current $I_r$ crosses zero. At this instant, the switch $Q_1$ is switched OFF. This zero current switching of the switch $Q_1$ has the advantage that the detrimental effects of tail currents in the IGBT switch $Q_1$ are largely avoided.

The voltage $U_s$ which had been clamped to $U_{in}$ is now allowed to drop, as shown in FIG. 2(B). If the junction point between the switches $Q_1$ and $Q_2$ were not connected to the resonance tank 14, the series connection of capacitors $C_{s1}$ and $C_{s2}$ would reach an equilibrium, and $U_s$ would drop to $U_{in}/2$. However, the snubber capacitors $C_{s1}$ and $C_{s2}$ form another oscillating circuit with the inductor $L_r$, and this oscillating circuit tends to discharge $C_{s2}$ further. Ideally, $U_s$ would therefore drop to zero.

In order to reduce switching losses, the dead time $T_d$ should be selected such that the switch $Q_2$ is switched ON in the very moment when $U_s$ reaches zero because, then, no energy that has been stored in the capacitor $C_{s2}$ would be dissipated when this capacitor is short-circuited. In practice, however, $U_s$ may not always reach exactly zero, because the oscillating circuit is subject to external influences such as fluctuations of the input voltage $U_{in}$ and changes of the load conditions. This is why the desirable zero voltage switching cannot always be achieved. What can be achieved, however, is a so-called valley switching, i.e. the switch $Q_2$ is switched ON when $U_s$ (the absolute value thereof) reaches a minimum. The exact timing $t_3$ when this condition is fulfilled will also depend upon the external influences mentioned above and may therefore vary for varying operating conditions of the converter.

At the time $t_4$, the switch $Q_2$ will be switched OFF again (zero current switching at resonance), and the discharge process of the capacitor $C_{s1}$ between $t_4$ and $t_5$ is the mirror image of the process between $t_2$ and $t_3$. At $t_5$, the switch $Q_1$ is switched ON again (valley switching) and another cycle will start.

In the converter according to the present disclosure, the controller 18 (see FIG. 4) is configured to determine the ON switching timings $t_3$ and $t_5$ on the basis of the actual value of the voltage $U_s$ as measured by the voltage sensor 22, so that the ZVS condition or at least the valley switching condition can be fulfilled even under varying operating conditions of the converter.

In the example that is described here, the switching frequency of the switches $Q_1$ and $Q_2$ is varied in order to comply with varying demands for output current $I_{out}$. For example, the switching frequency may vary in an a range between 25 kHz and 50 kHz.

Figure 3:
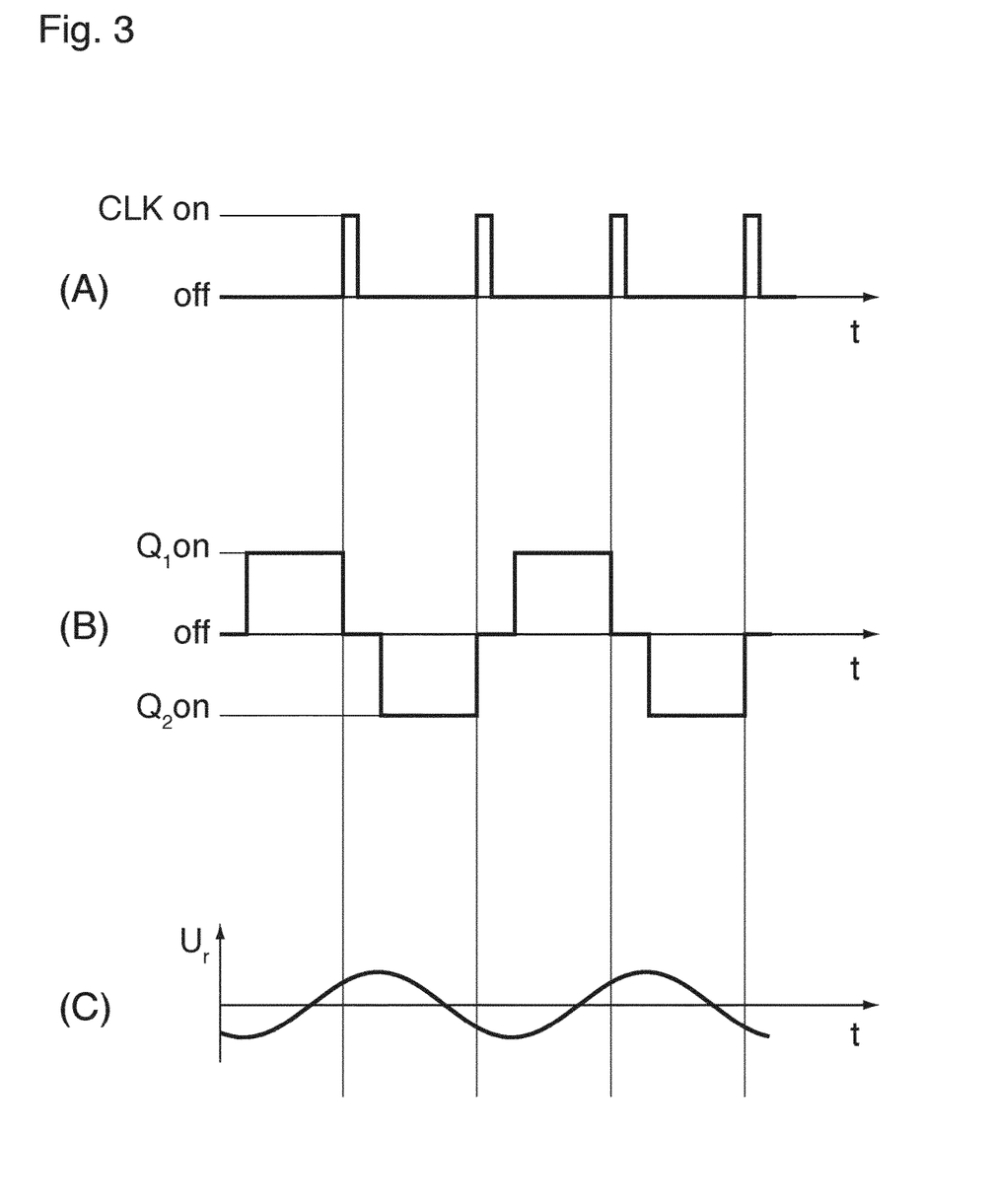

FIG. 3(A)-(C) show waveforms for a mode of operation in which the converter operates above resonance. Since the dead times $T_d$ are determined by the valley switching condition, an increase of the switching frequency means that the duty cycle of the ON periods of the switches $Q_1$ and $Q_2$ becomes shorter, as has been shown in FIG. 3(B). The switching frequency is determined by a clock signal CLK whose waveform is shown in FIG. 3(A). The timings of the clock pulses correspond to the OFF switching timings $t_2$ and $t_4$ in FIG. 2, i.e. the clock pulses alternatingly trigger the OFF switching operations of the switches $Q_1$ and $Q_2$. The ON-switching operations will then be determined by the valley switching criterion.

FIG. 3(C) shows the voltage $U_r$ of the resonance tank for the off-resonance mode. Since the switching frequency is higher than the resonance frequency, the phase delay of the voltage $U_r$ is larger than 90°, and the amplitude is smaller, so that less power is transferred to the output side. The shortened duty cycles of the switches $Q_1$ and $Q_2$ will also contribute to the reduced power transfer (and also to a decrease of the input current $I_{in}$).

Figure 4:
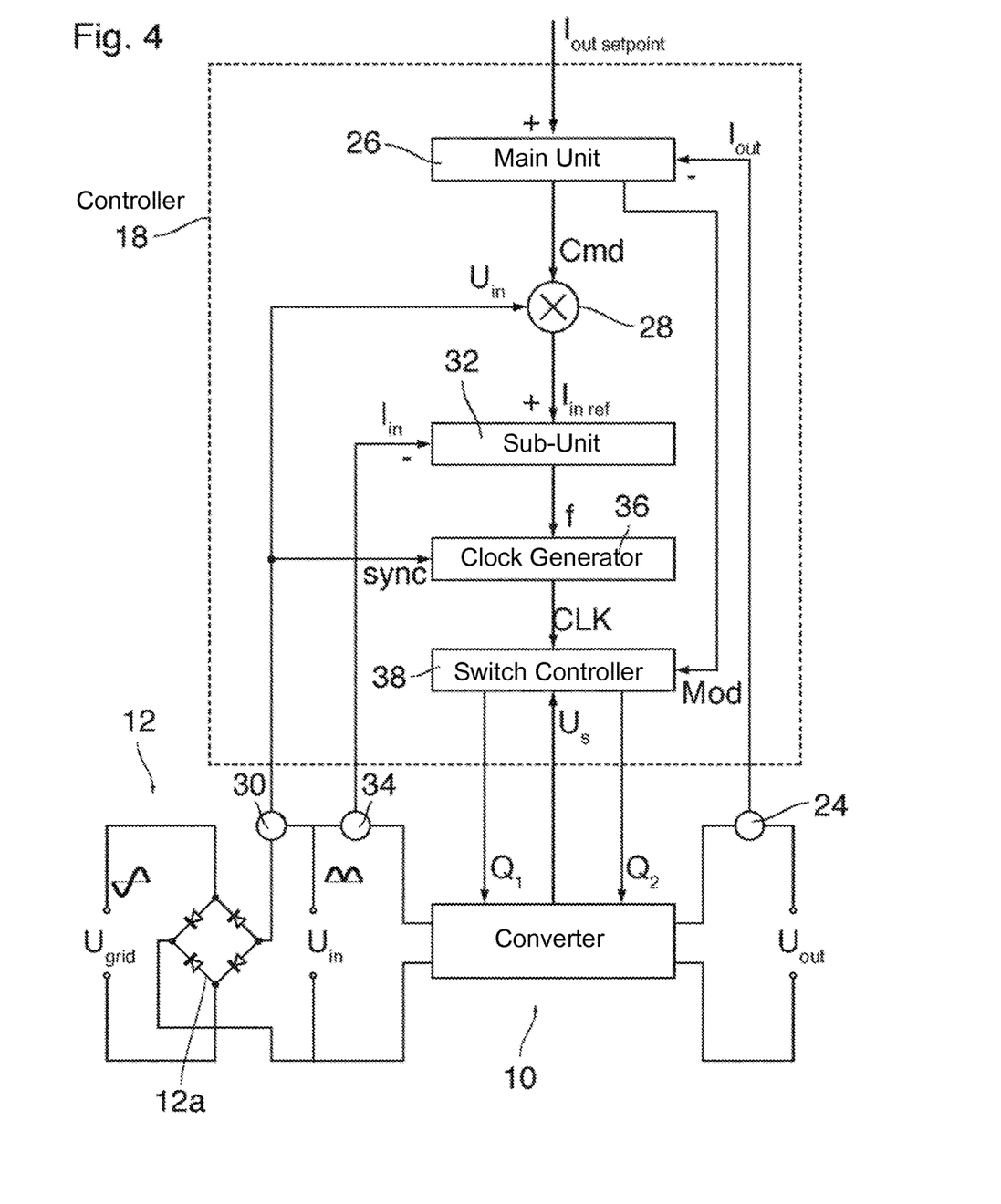
FIG. 4 is a block diagram of a controller for controlling switches of the converter shown in FIG. 1, according to an exemplary embodiment of the present disclosure.

The controller 18 will now be described in greater detail by reference to FIG. 4.

In this example, the voltage source 12 is formed by a power supply having a diode full bridge 12a for rectifying an AC grid voltage $U_{grid}$. However, the power supply does not have a capacitor for smoothening the rectified voltage, so that the input voltage $U_{in}$ for the converter 10 has a waveform composed of sinusoidal positive half waves.

Further, it is assumed in this example that the converter 10 is current controlled, i.e. the output current $I_{out}$ is controlled to a given target value designated by a demand signal $I_{out\ setpoint}$ that is supplied to the controller 18. The actual output current $I_{out}$ is measured by a current sensor 24 and is delivered to the controller 18 as a feedback signal.

A main unit 26 of the controller 18 compares the output current $I_{out}$ to the demand signal $I_{out\ setpoint}$ and generates a command signal Cmd that is supplied to a multiplier 28. A voltage sensor 30 detects the input voltage $U_{in}$ and sends a signal representing this input voltage to another input of the multiplier 28. The product of the command signal Cmd and the input voltage $U_{in}$ is supplied to a sub-unit 32 of the controller 18 as a reference signal $I_{in\ ref}$. The sub-unit 32 compares this reference signal to the input current $I_{in}$ that is detected by a current sensor 34. As a comparison result, the sub-unit 32 outputs a frequency signal f to a clock generator 36. This clock generator further receives a synchronizing signal sync that is derived from the input voltage $U_{in}$ and generates the clock signal CLK with the frequency f and synchronized with the pulsating input voltage $U_{in}$ and, indirectly, with the grid voltage $U_{grid}$.

The clock signal CLK is supplied to a switch controller 38 which further receives the voltage $U_s$ as sensed by the voltage sensor 22 and controls the gates of the switches $Q_1$ and $Q_2$. For example, the switch controller 38 may determine the ON-timings by monitoring both, the absolute value and the time derivative of $U_s$. Thus, in a normal mode of operation, the switch controller 38 controls the OFF-timings of the switches $Q_1$ and $Q_2$ on the basis of the clock signal CLK and the ON timings of the switches on the basis of the sensed voltage $U_s$. The synchronisation of the clock signal CLK with the grid voltage has the advantage that undesirable interferences between the switching frequency and the grid frequency (50 Hz) are avoided and EMI is reduced.

The frequency of the clock signal CLK is varied in order to control both the output current $I_{out}$ and the input current $I_{in}$. In an inner feedback loop including the sub-unit 32, the input current $I_{in}$ is controlled so as to preserve the sinusoidal waveform of the input current (power factor correction). The frequency of the clock signal CLK is controlled as to cause the input current $I_{in}$ to follow the reference value $I_{in\ ref}$ which is the product of $U_{in}$ and the constant (or slowly varying) command signal Cmd, so that $I_{in}$ is forced to have the same sinusoidal half waves as U.

The amplitude of the half waves of $I_{in}$ is determined by the command signal Cmd which is varied in an outer feedback loop comprising the main unit 26 and causing the output current $I_{out}$ to follow the demand as specified by the demand signal $I_{out\ setpoint}$.

The switch controller 38 has different modes of operation selectable by means of a mode signal Mod which the main unit 26 delivers to the switch controller 38. For example, since the clock signal CLK determines only the OFF timings of the switches $Q_1$ and $Q_2$ and the ON timings are determined by the valley switching criterion, it is clear that a start mode should be provided for delivering the first or the first few ON pulses to the switches $Q_1$ and $Q_2$ until the converter has started to resonate and a meaningful voltage $U_s$ can be derived. In accordance with an exemplary embodiment, valley switching is only allowed in a pre-defined time window. If valley switching fails, outside the normal operation conditions, the switches are forced to switch on.

When the demand represented by $I_{out\ setpoint}$ decreases, the switching frequency f may be increased so as to reduce the output current $I_{out}$ accordingly. However, when the setpoint is decreased further, a point will be reached where the switching frequency must be so high that even with the converter that is proposed here the residual switching losses would become predominant. This is why the switch controller 38 has additional modes of operation which permit to reduce the output current even beyond this point.

Figure 5:
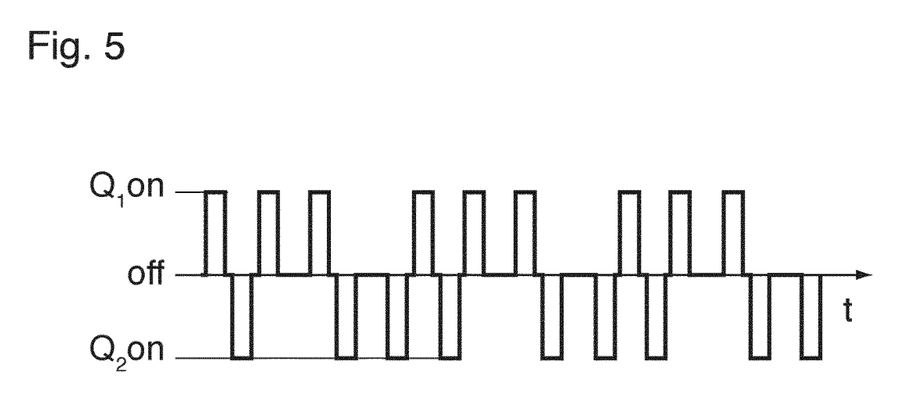
FIGS. 5 and 6 show waveforms illustrating different modes of operation of the converter.

FIG. 5 illustrates, on a reduced time scale, the sequence of ON and OFF pulses of the switches $Q_1$ and $Q_2$ for a mode of operation in which the power transfer is reduced by periodically skipping isolated ones of the ON pulses of both switches. In the example shown, one out of four ON-pulses of both switches is skipped, so that the power transfer will be reduced by 25%. The timings at which the ON-pulses of the two switches are skipped are offset relative to one another, which helps the resonance tank to stay in the resonant mode. Although random pulse skipping would be possible, it is conceived to use pre-defined regular pulse skipping patterns in order avoid random pulse cancellation and sub-harmonic output current variations.

Figure 6:
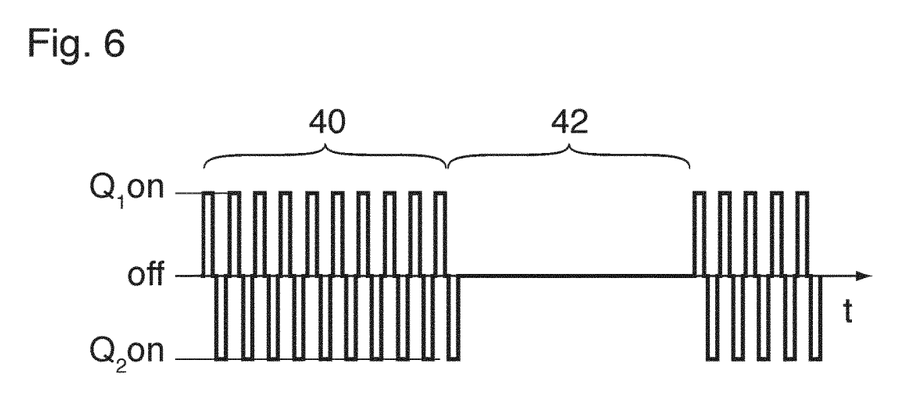

FIG. 6 illustrates, on an even further reduced time scale, a mode of operation, wherein the sequence of ON pulses of both switches is chopped into bursts 40 that are separated by breaks 42. In practice, the number of pulses per burst will be significantly larger than shown in FIG. 6, large enough for the resonance tank to tune-in, and the breaks 42 may be so large that the resonance oscillations may decay until the next burst begins. In this way, the power transfer may be reduced to 50% or even less. Yet, given that the switching frequency may be as high as 50 kHz, the repeat frequency of the bursts 40 may be so large that the resulting ripple in the output current will be negligible.

Of course, it is also possible to combine the pulse skipping mode of FIG. 5 with the burst mode of FIG. 6 in order to reduce the power transfer even further. Moreover it is possible to vary the ratio between the skipped and the non-skipped pulses in the pulse skip mode and/or to vary the ratio between the length of the bursts and the length of the breaks in the burst mode, and all this may additionally be combined with frequency control. For example, when switching from one mode to another, the converter frequency may be set to a pre-defined value, based on a frequency table or a suitable algorithm, so as to prevent a momentary step in the output current during the transition.

Figure 7:
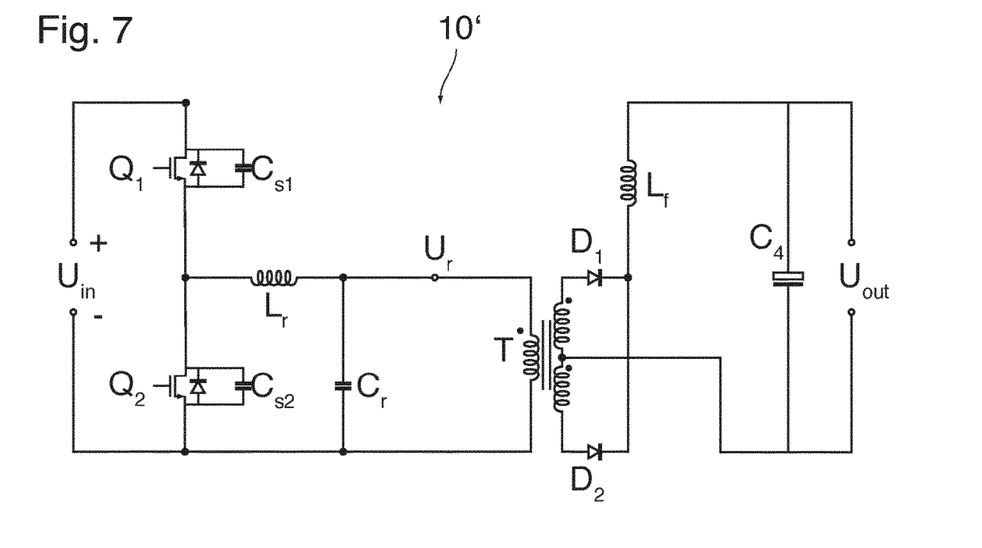
FIGS. 7 and 8 are circuit diagrams of resonant converters according to exemplary embodiments of the present disclosure.

FIG. 7 shows a resonant converter 10' according to an exemplary embodiment of the present disclosure. In this embodiment, the resonance tank has only a single capacitor $C_r$, so that the circuit is less symmetric than in the embodiment shown in FIG. 1. Nevertheless, the function principles explained above can be applied. Further, the diode full bridge D that had been shown in FIG. 1 has been replaced by a half bridge of diodes $D_1$, $D_2$ and an output inductor $L_f$. The output capacitor $C_4$ is connected to a centre tap of the secondary winding of the transformer T.

Figure 8:
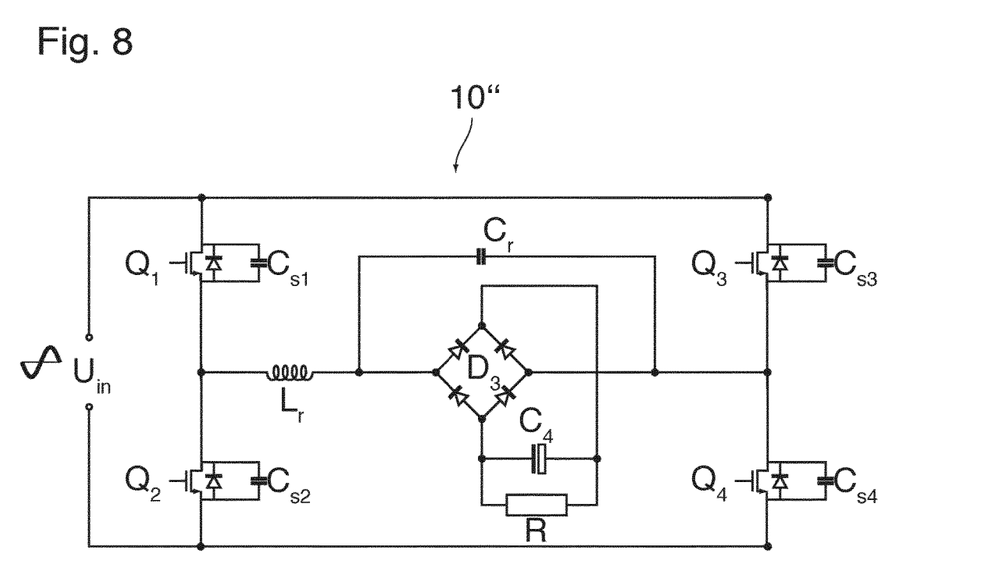

FIG. 8 shows an exemplary embodiment of a converter 10", wherein four switches $Q_1$, $Q_2$, $Q3$ and $Q_4$ form a full bridge, so that the converter can be powered directly by an AC input voltage U. In this full bridge configuration, the switches $Q_1$ and $Q_4$ will always be switched simultaneously, just as the switches $Q_2$ and $Q_3$. The resonance tank is formed by the inductor $L_r$ and a single capacitor $C_r$, and the voltage drop across the capacitor $C_r$ is rectified by a diode full bridge $D_3$ and a capacitor $C_4$, so that a DC output voltage is applied to a load R.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A resonant power converter comprising:
   a rectifier receiving an AC input voltage and outputting a fluctuating DC input voltage with a waveform composed of sinusoidal half waves;
   a resonance tank formed by a first set of capacitors of equal capacitances and an inductor connected to a midpoint between the first set of capacitors;
   at least two switches connected to the resonance tank and the rectifier in a bridge configuration, the fluctuating DC input voltage being supplied from the rectifier to the at least two switches without a capacitor being disposed therebetween, and the inductor being connected at a midpoint between the at least two switches, the inductor thereby being connected between the at least to switches and the first set of capacitors;
   a plurality of snubber capacitors connected in parallel to each of the switches;
   a second set of capacitors of equal capacitances, wherein the first set of capacitors is parallel to the at least two switches, and the second set of capacitors is parallel to the first set of capacitors;
   a transformer whose primary side is connected at one end to the midpoint between the first set of capacitors and to the inductor and at another end to a midpoint between the second set of capacitors;
   a controller configured to control ON and OFF timings of the at least two switches so as to excite the resonance tank; and
   a voltage sensor configured to sense a voltage drop across at least one of the switches,
   wherein the controller is configured to switch the at least one of the switches to the ON state when the absolute value of the sensed voltage drop reaches a minimum,
   wherein the voltage sensor is configured to sense the voltage drop across the at least one of the switches at a junction point between the at least two switches,
   wherein the controller is configured to control an input current of the converter in accordance with a sinusoidal waveform,
   wherein the controller is configured to determine switch timings of the switches into the OFF state on the basis of a clock signal with a given frequency, and
   wherein the clock signal is synchronized with one of the AC input voltage and the fluctuating DC input voltage.

2. The converter according to claim 1, wherein the frequency is variable for adjusting at least one of an output power or an output current of the converter to a given demand.

3. The converter according to claim 2, wherein the controller is configured to feedback-control the output current of the converter.

4. The converter according to claim 3, wherein the controller is configured to feedback-control the input current.

5. The converter according to claim 4, wherein the controller has nested feedback loops for controlling both the output current and the input current of the converter.

6. The converter according to claim 2, wherein the controller has a mode of operation in which bursts of ON and OFF periods of the switches alternate with breaks in which all switches are in the OFF state.

7. The converter according to claim 6, wherein the controller is configured to feedback-control the output current of the converter.

8. The converter according to claim 7, wherein the controller is configured to feedback-control the input current.

9. The converter according to claim 1, wherein the ON periods of the at least two switches are skipped at timings that are offset relative to one another.

10. The converter according to claim 1, wherein the controller has a mode of operation in which bursts of ON and OFF periods of the switches alternate with breaks in which all switches are in the OFF state.

11. The converter according to claim 1, comprising:
    an LCC topology with parallel load.

12. The converter according to claim 1, wherein the controller has nested feedback loops for controlling both an output current and the input current of the converter.

13. The converter according to claim 1, wherein the controller has a mode of operation in which isolated ON periods of the at least two switches are skipped in a periodic time pattern for reducing an output power of the converter.

* * * * *